US009929931B2

(12) United States Patent
Breitgand et al.

(10) Patent No.: US 9,929,931 B2
(45) Date of Patent: Mar. 27, 2018

(54) EFFICIENT PROVISIONING AND DEPLOYMENT OF VIRTUAL MACHINES

(71) Applicant: International Business Machines Corporation, Armonk, NY (US)

(72) Inventors: David Breitgand, Modiin (IL); Amir Epstein, Herzelia (IL); Kenneth Nagin, Mitzpeh Hoshiya (IL)

(73) Assignee: International Business Machines Corporation, Armonk, NY (US)

(*) Notice: Subject to any disclaimer, the term of this patent is extended or adjusted under 35 U.S.C. 154(b) by 387 days.

(21) Appl. No.: 14/050,365

(22) Filed: Oct. 10, 2013

(65) Prior Publication Data

US 2015/0106520 A1 Apr. 16, 2015

(51) Int. Cl.
G06F 9/455 (2006.01)
H04L 12/26 (2006.01)
H04L 29/08 (2006.01)
G06F 9/50 (2006.01)

(52) U.S. Cl.
CPC .......... H04L 43/16 (2013.01); G06F 9/45558 (2013.01); H04L 67/101 (2013.01); G06F 9/5005 (2013.01); G06F 2009/4557 (2013.01); G06F 2009/45562 (2013.01); G06F 2009/45575 (2013.01)

(58) Field of Classification Search
CPC ....... H04L 43/16; H04L 67/101; H04L 43/08; H04L 67/1004; H04L 67/1008; H04L 67/1012; G06F 9/45558; G06F 2009/4557; G06F 9/5005; G06F 9/5061; G06F 9/5072; G06F 9/5077; G06F 2009/45562; G06F 2009/45583; G06F 2009/45591; G06F 2009/45575
See application file for complete search history.

(56) References Cited

U.S. PATENT DOCUMENTS 8,046,473 B2 10/2011 Piper et al.
8,065,676 B1 * 11/2011 Sahai .................... G06F 9/5077
709/226

(Continued)

OTHER PUBLICATIONS

Breitgand et al., "SLA-aware Placement of Multi-Virtual Machine Elastic Services in Compute Clouds", 12th IFIP/IEEE International Symposium on Integrated Network Management (IM 2011) and Workshops, 2011, pp. 161-168.*

(Continued)

*Primary Examiner* — Vivek Srivastava
*Assistant Examiner* — William C McBeth
(74) *Attorney, Agent, or Firm* — Christopher M. Coy

(57) ABSTRACT

Machines, systems and methods for managing quality of service in a virtualized computing environment, the method comprising: provisioning one or more active virtual machines (VMs) over one or more hosts in a virtualized computing network, wherein one or more resources are allocated to the active VMs before the active VMs service one or more requests; monitoring information associated with quality of service defined for servicing of the requests; and designating at least an active VM as a shadow VMs, in response to results of the monitoring, wherein at least one resource remains allocated to the shadow VM, while the shadow VM enters a dormant state and no longer services any requests.

14 Claims, 10 Drawing Sheets

(56) References Cited

U.S. PATENT DOCUMENTS

| | | | | |
|---|---|---|---|---|
| 8,141,090 | B1* | 3/2012 | Graupner | G06F 9/45558 709/225 |
| 8,793,684 | B2 | 7/2014 | Breitgand et al. | |
| 9,575,808 | B1* | 2/2017 | Yamala | G06F 9/45558 |
| 2006/0143617 | A1* | 6/2006 | Knauerhase | G06F 9/50 718/104 |
| 2006/0190714 | A1* | 8/2006 | Vaszary | G06F 9/5083 713/100 |
| 2008/0263553 | A1* | 10/2008 | Lueck | G06F 9/505 718/102 |
| 2010/0306382 | A1* | 12/2010 | Cardosa | G06F 9/5077 709/226 |
| 2010/0332906 | A1* | 12/2010 | Agrawal | H04L 41/0631 714/37 |
| 2011/0029970 | A1* | 2/2011 | Arasaratnam | G06F 9/5077 718/1 |
| 2011/0099267 | A1* | 4/2011 | Suri | G06F 9/4856 709/224 |
| 2011/0154327 | A1* | 6/2011 | Kozat | G06F 9/505 718/1 |
| 2011/0214005 | A1* | 9/2011 | Biran | G06F 11/008 714/1 |
| 2011/0282982 | A1* | 11/2011 | Jain | G06F 9/5094 709/223 |
| 2012/0005505 | A1* | 1/2012 | Tolia | G06F 1/206 713/320 |
| 2012/0240110 | A1* | 9/2012 | Breitgand | G06F 9/45558 718/1 |
| 2013/0014107 | A1* | 1/2013 | Kirchhofer | G06F 9/5083 718/1 |
| 2013/0047156 | A1* | 2/2013 | Jian | G06F 9/5055 718/1 |
| 2013/0054813 | A1* | 2/2013 | Bercovici | G06F 9/45533 709/226 |
| 2013/0055251 | A1* | 2/2013 | Anderson | G06F 9/45558 718/1 |
| 2013/0060946 | A1* | 3/2013 | Kenneth | G06F 12/0866 709/226 |
| 2013/0117359 | A1* | 5/2013 | Husain | G06F 9/445 709/203 |
| 2013/0179574 | A1* | 7/2013 | Calder | G06F 9/5033 709/226 |
| 2013/0185433 | A1* | 7/2013 | Zhu | H04L 67/303 709/226 |
| 2013/0268672 | A1* | 10/2013 | Justafort | H04L 67/10 709/226 |
| 2013/0275969 | A1* | 10/2013 | Dimitrov | G06F 9/45558 718/1 |
| 2014/0344440 | A1* | 11/2014 | Dutta | H04L 41/0823 709/224 |
| 2015/0040122 | A1* | 2/2015 | Singleton, IV | G06F 9/45558 718/1 |
| 2015/0046572 | A1* | 2/2015 | Cheng | G06F 9/455 709/220 |
| 2015/0058843 | A1* | 2/2015 | Holler | G06F 9/455 718/1 |
| 2015/0143366 | A1* | 5/2015 | Suragi Math | G06F 9/5077 718/1 |
| 2015/0249615 | A1* | 9/2015 | Chen | G06F 9/45558 709/226 |
| 2015/0261578 | A1* | 9/2015 | Greden | G06F 9/45533 718/1 |
| 2015/0355923 | A1* | 12/2015 | Keller | G06F 9/45558 718/1 |
| 2016/0139949 | A1* | 5/2016 | Jagannath | G06F 9/5022 718/1 |
| 2016/0170469 | A1* | 6/2016 | Sehgal | G06F 9/505 713/320 |

OTHER PUBLICATIONS

Fang et al., "VMPlanner: Optimizing virtual machine placement and traffic flow routing to reduce network power costs in cloud data centers", Computer Networks, vol. 57, No. 1, Jan. 2013, pp. 179-196.*

Li et al., "EnaCloud: An Energy-saving Application Live Placement Approach for Cloud Computing Environments", 2009 IEEE International Conference on Cloud Computing, Bangalore, 2009, pp. 17-24.*

Xiaoli et al., "An energy-aware VMs placement algorithm in Cloud Computing environment", 2012 Second International Conference on Intelligent System Design and Engineering Application, 2012, pp. 627-630.*

Diaconescu et al., "Energy-aware Placement of VMs in a Datacenter", IEEE 9th International Conference on Intelligent Computer Communication and Processing (ICCP), Sep. 2013, pp. 313-318.*

Knauth et al., "Fast Virtual Machine Resume for Agile Cloud Services", 2013 International Conference on Cloud and Green Computing, Sep. 30-Oct. 2, 2013, pp. 127-134.*

Zhu et al., "Twinkle: A Fast Resource Provisioning Mechanism for Internet Services", Proceedings of IEEE INFOCOM 2011, pp. 802-810.

Mior et al., "FlurryDB: A Dynamically Scalable Relational Database with Virtual Machine Cloning", Proceedings of the 4th Annual International Conference on Systems and Storage SYSTOR 2011, Article 1.

Sun et al., "Fast Live Cloning of Virtual Machine Based on Xen", 11th IEEE International Conference on High Performance Computing and Communications, pp. 392-399, 2009.

Lagar-Cavilla et al., "SnowFlock: Rapid Virtual Machine Cloning for Cloud Computing", EuroSys '09 Proceedings of the 4th ACM European conference on Computer systems, pp. 1-12, 2009.

* cited by examiner

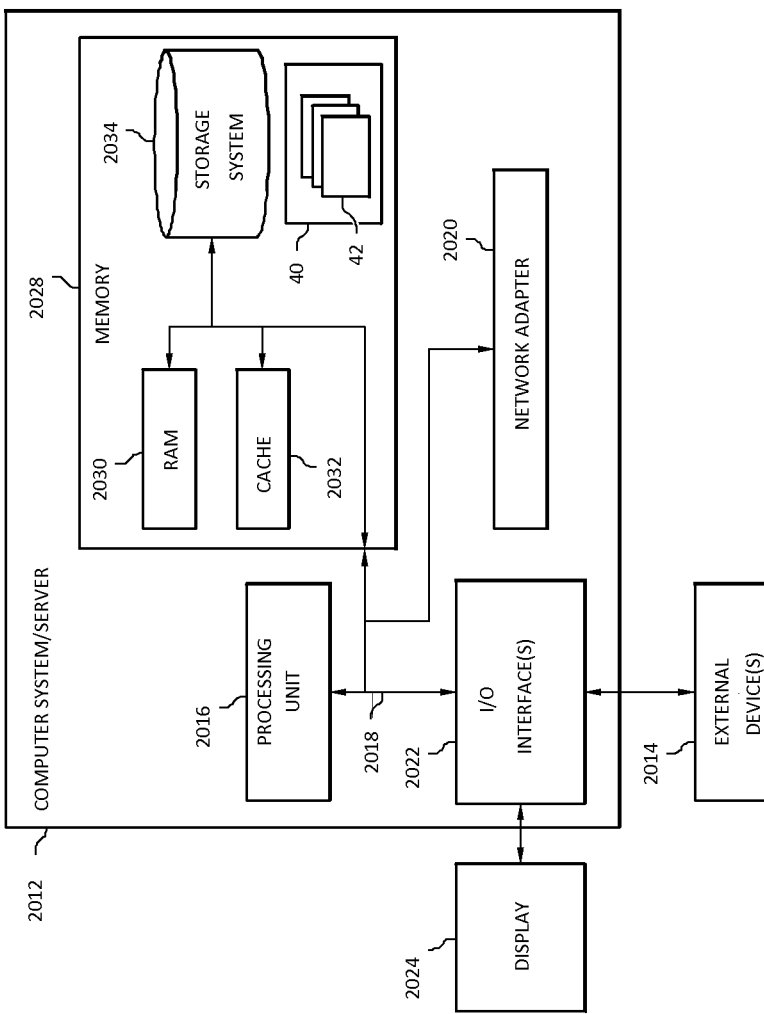

EFFICIENT PROVISIONING AND DEPLOYMENT OF VIRTUAL MACHINES

CROSS-REFERENCE TO RELATED APPLICATIONS

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to efficient provisioning and deployment of virtual machines in a computing network.

BACKGROUND

In some networked environments, shared computing resources are provided to computing systems or other devices connected to the network on demand by way of deploying one or more virtual machines (VMs). A VM, generally, runs as a software application and provides services that support a platform-independent programming environment which abstracts away details of the underlying hardware or operating system for the party requesting the respective services.

VMs are typically provided by a management layer that is part of the networked computing architecture. Typically, the management layer downloads VM images from a remote repository to a local storage medium that is shared with the virtualization platform. The management layer then deploys the VM by executing the image stored at the locally shared storage medium. Once a VM is deployed, operational resources are allocated to the VM. If a VM is no longer needed, the operational resources are deallocated (i.e., the VM is decommissioned) to allow the resources to be reallocated to other VMs.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Machines, systems and methods for managing quality of service in a virtualized computing environment are provided. The method comprises provisioning one or more virtual machines (VMs) on one or more hosts in a virtualized computing network, wherein one or more resources are allocated to the VM before the active VMs service one or more requests; monitoring information associated with quality of service defined for servicing of the requests. The VMs that are allocated their resources according to demand and serving requests are termed active VMs. An application may comprise a number of active VMs to serve current requests and the number of active VMs varies with the requests load.

When requests load subsides, one or more active VMs are no longer needed to support the desired level of experience for the application. Instead of decommissioning a redundant VM, an alternative way for re-purposing of the resources being held by a redundant VM is to allow the VM to remain in a dormant state until the VM is either brought back to actively servicing requests of the same application or it is decommissioned to allow reclaiming of its resources by another VM belonging to a different application. The VM that is in the dormant state is called shadow VM. A shadow VM is a deactivated (i.e., suspended VM) wherein resources except the main memory and secondary storage of the shadow VM are de-allocated.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

FIGS. 5A through 5C illustrated a computing node in a cloud computing environment with abstraction model layers in accordance with one embodiment.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
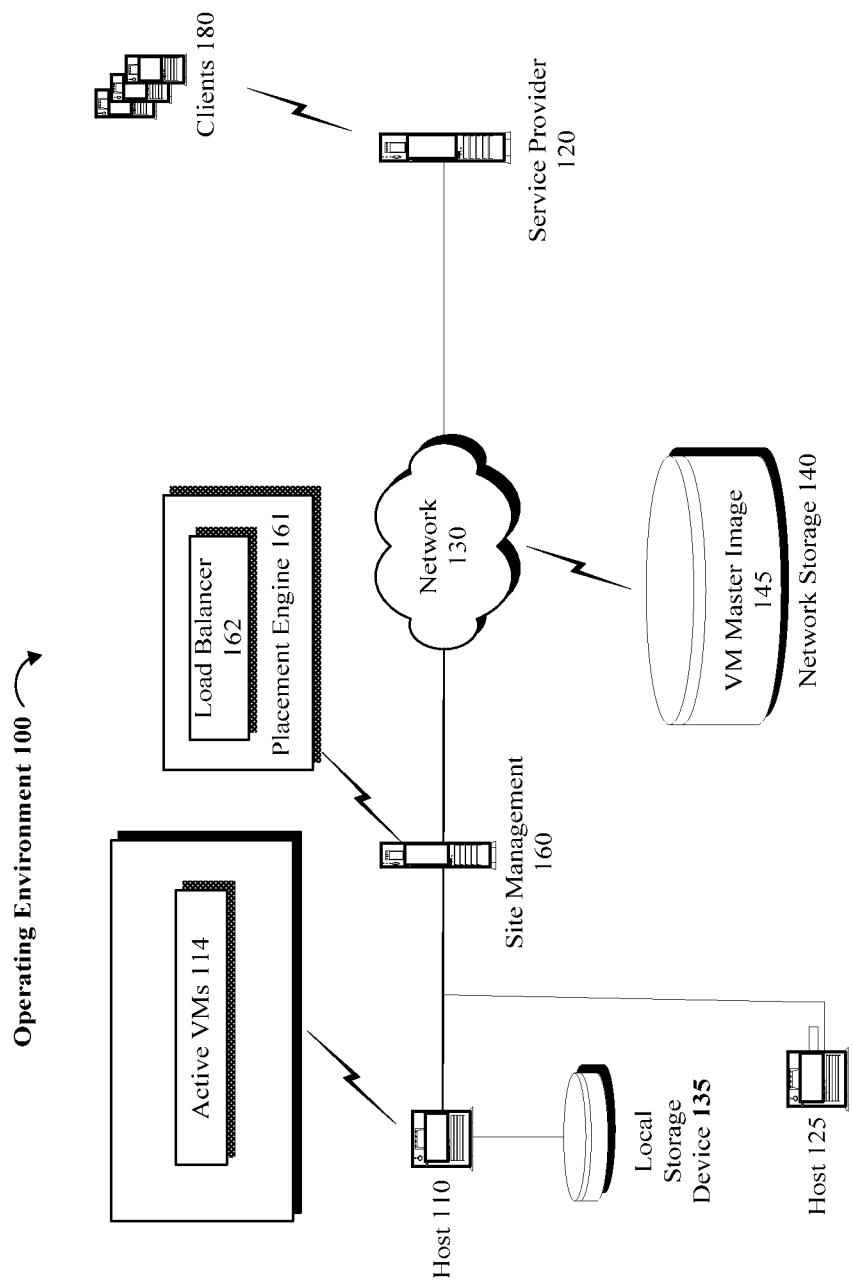
FIG. 1 illustrates an exemplary block diagram of an operating environment, in accordance with one or more embodiments, wherein a host is configured to deploy one or more VMs to service a plurality of requests.

Referring to FIG. 1, an exemplary operating environment 100 is illustrated, wherein a service provider 120 is in communication with one or more virtualization platform hosts 110, 120 (hereafter hosts 110 or 120) by way of a data communication network 130. Service provider 120 may be implemented, for example, over a platform that supports Infrastructure as a Service (IaaS) to deliver computing infrastructure as a service. Service provider 120 is in communication with a site management 160 with a placement engine 161 and load balancer 162.

Depending on implementation, certain parameters (e.g., system bandwidth, service requests, application history and execution patterns, etc.) may be used to determine in advance when, how often, and how many copies of a VM's image are to be cloned or whether one or more active VMs are to be rendered inactive. Same or related parameters may be used to determine whether to store copies of a VM's image on local stand alone storage media, shared storage media, remotely available network storage devices, or a combination of the same.

Figure 2:
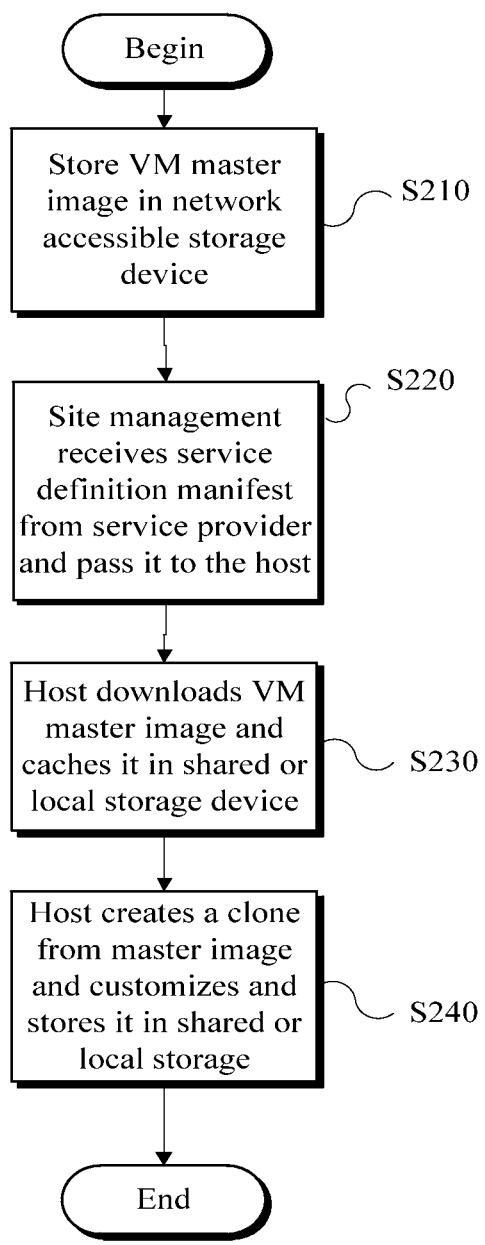
FIG. 2 illustrates a flow diagram of a method for managing the deployment of VMs from a master image, in accordance with one or more embodiments.

Referring to FIG. 2, service provider 120 may store, in network storage 140, at least one VM master image 145 (S210), where said VM master image may be utilized to provision a VM 114 on host 110. The service provider 120 may specify service components (i.e., images) in a service definition manifest. Site management 160 may receive the service definition manifest from service provider 120 and creates one or more VM instances 114 at one or more hosts 110 (S220) causing VM 114 to be hosted on host 110.

Host 110 may download VM master image 145 to a local storage device 135 from network storage device 140 based on the service definition manifest and cache it in a shared or a local storage device (S230). Host 110 may create a clone from VM master image 145 and customize and store it in shared or local storage (S240). VM master image 145 may be used for future cloning process, avoiding a lengthier download of the VM master image 145 from a remotely located network storage 140.

In one embodiment, host 110 stores (e.g., caches) a copy of VM master image 145 on local storage device 135. Alternatively, a copy of the VM master image 145 may be cached in shared storage by host 110. In one or more implementations, host 110, instead of site management 160, may handle the responsibility for the above-noted caching operation. As provided in further detail below, the clones of the master image may be created by way of a copy-on-write (CoW) process to act as boot images of VM 114.

CoW refers to the process of creating an instant copy of an image of a target application (e.g., resource) by way of pointing to the original image of the target application, instead of copying the image. A copy of the image may be later created as needed. Thus, if multiple requests are received for the same resource, one or more pointers to the resource may be created by way of CoW first, and the copying may be postponed to a later time (e.g., when the system is idle) or the moment when there is an ultimate need for copying the image.

Accordingly, in one implementation, using the CoW process, a clone of a VM 114 image may be created instantly when additional requests for services provided by VM 114 are received. This strategy avoids the need for creating multiple redundant copies of the VM's image in advance in anticipation of future service requests which may never materialize in earnest. Some level of elasticity for provisioning host 110 services may be achieved by storing in advance, or by copying on demand, multiple copies of VM's image and deploying said images as need arises.

In an implementation that utilizes the CoW process for cloning VM images, system performance may suffer because the CoW process may contribute to increased latency at a later time as a newly created VM using the CoW process needs to warm up by way of initialization until the new VM is capable of fully sharing the load of the service via the load balancer 162. To overcome the above-noted latency associated with the use of the CoW process, certain VMs may be held in a dormant status (i.e., as shadow VMs) and initialized quickly, as provided in further detail below.

Figure 3A:
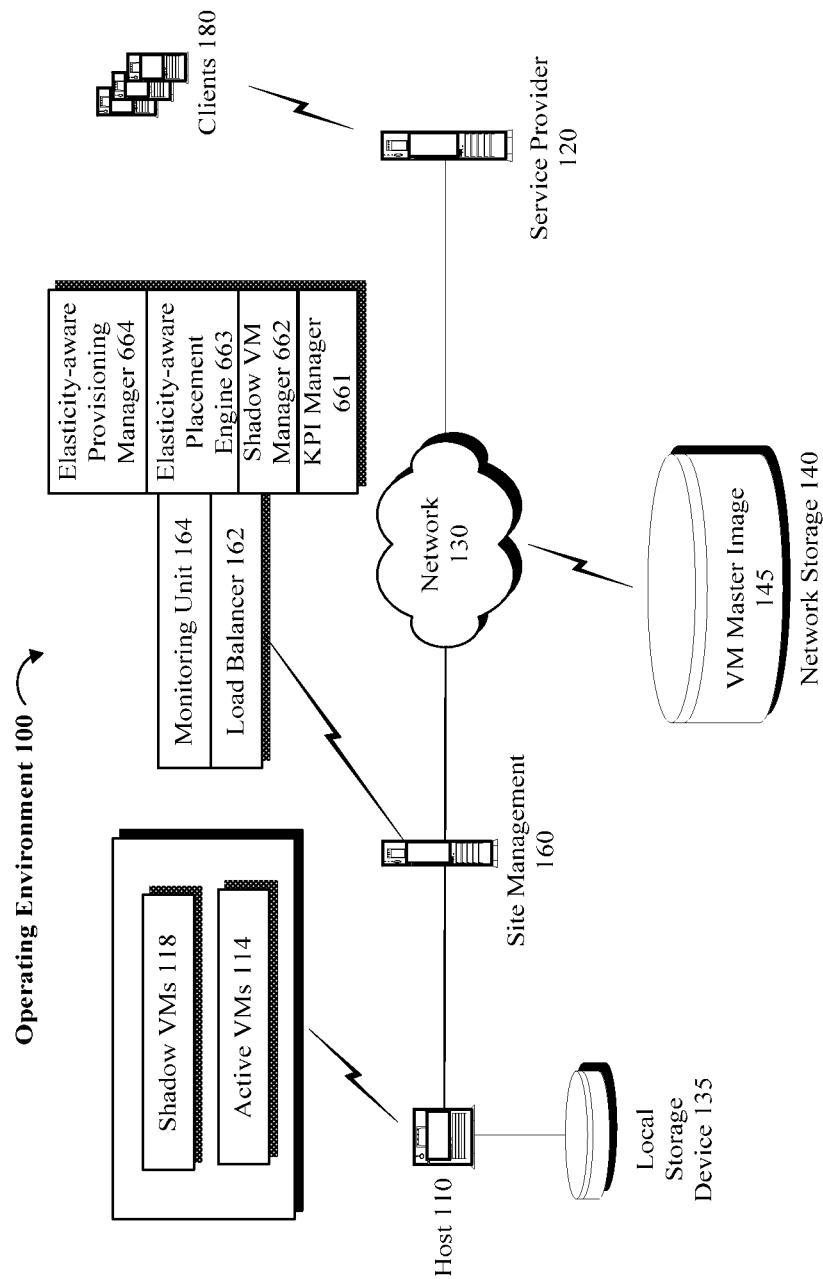
FIG. 3A illustrates an exemplary block diagram of an operating environment, in accordance with one or more embodiments, wherein a site management component monitors the deployment of one or more VMs to service a plurality of requests.

Referring to FIG. 3A, in one embodiment, to introduce efficiency in provisioning of VMs in the operating environment 100, multiple pools of VMs may be designated and monitored so that, for example, VMs that are actively involved in providing a service belong to one or more active pools and the VMs that are no longer needed or are not actively involved in providing a service may be added to one or more inactive pools. In one implementation, a VM 114 that is no longer active may be kept in a dormant mode as a shadow VM 118. That is, in the dormant mode, some resources, notably main memory and secondary storage, allocated to a shadow VM 118 are not deallocated, so that the shadow VM 118 may be quickly reactivated and deployed when needed.

Figure 3B:
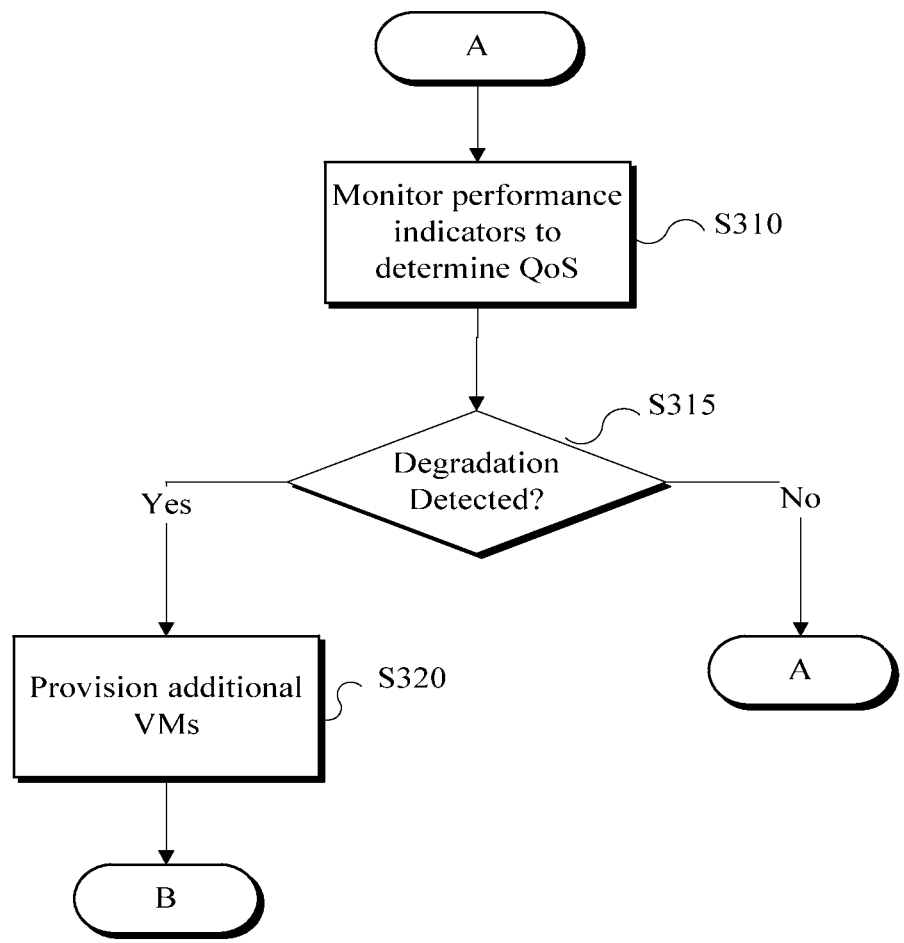
FIGS. 3B and 3C illustrate flow diagrams of one or more methods for managing deployment of active VMs from shadow VMs based on certain criteria, according to one or more embodiments.

In more detail, referring also to FIG. 3B a monitoring unit 164 may be utilized to monitor services provided by one or more active VMs 114. The monitoring unit 164 may communicate with other components in network 130 or site management 160 to monitor certain performance indicators and determine the quality of service (QoS) being provided by active VMs 114 to clients 180 (S310). The performance indicators may include the average throughput rate, average response time for transactions, number of simultaneous user sessions, or other related factors that may be used to determine when additional VMs are to be provisioned in order for a certain quality of service to be maintained.

If the monitoring unit 164 determines that the QoS has degraded (S315) or that it may decline due to the introduction of new factors (e.g., addition of new user sessions, failure of system resources, etc.), then the monitoring unit 164 may call for additional instances of VMs to be provisioned to help service coping with any additional or potential load on the system and to help maintain the targeted quality of service (S320). In one example embodiment, if the monitoring unit 164 observes that the QoS of a specific service is degraded or is going to be degraded, the monitoring unit 164 calls elasticity-aware placement engine 663 to provision more VMs 118.

In one embodiment, when an active VM 114 is to be switched to dormant state, the subject VM instance remains available in the background and not all resources (e.g., virtual memory space, CPU resources, physical storage space) allocated to the active VM 114 are immediately deallocated. Instead, the target VM is maintained in a dormant (i.e., semi-inactive status) and becomes a shadow VM 118. A shadow VM 118 is not considered for the purpose of workload assignment. For example, load balancer 162 may not count a shadow VM 118 as an active VM ready to service a request, until the shadow VM is reactivated from its dormant status.

Figure 3C:
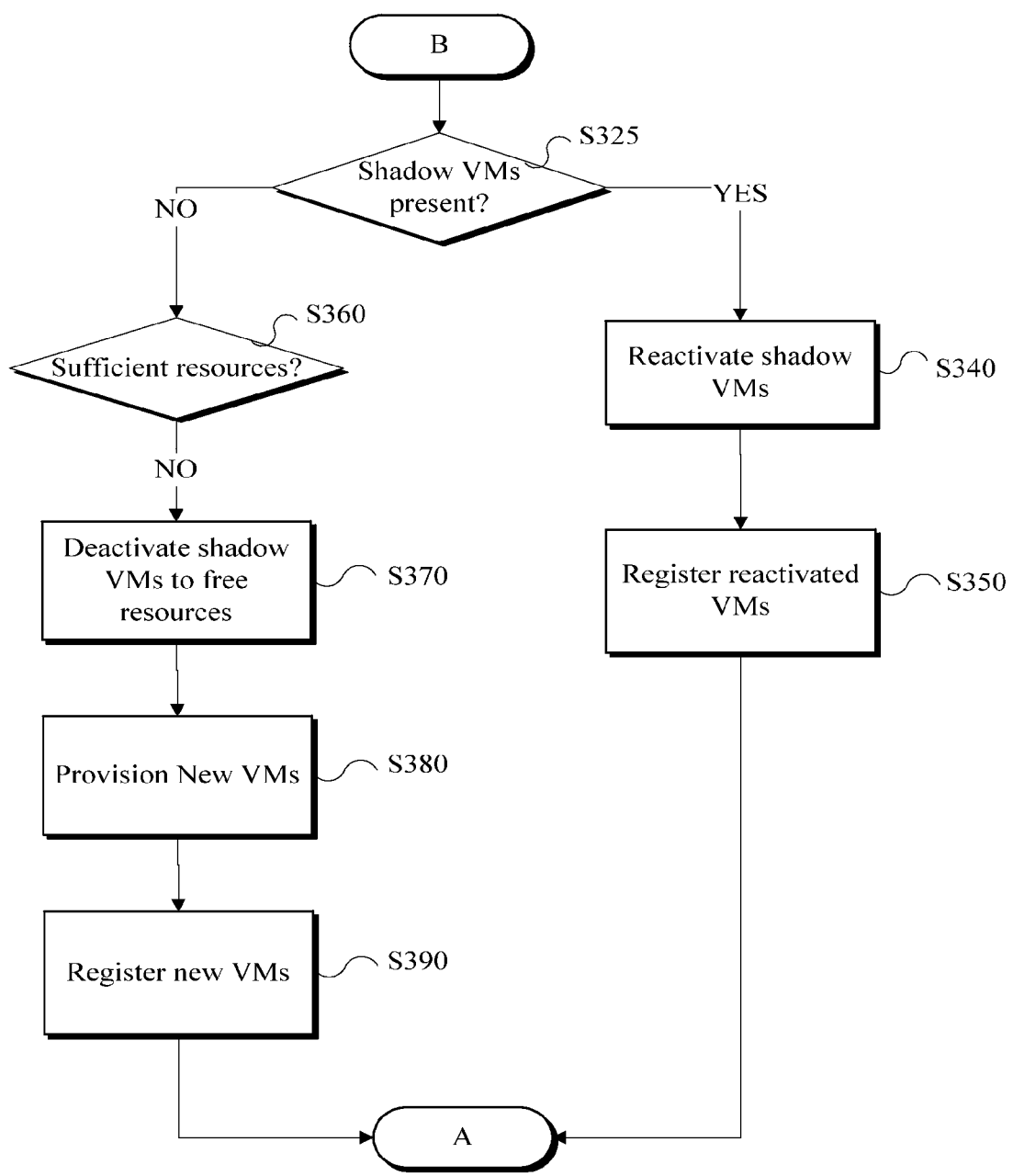

Referring to FIG. 3C, depending on implementation, monitoring unit 164 continues to monitor performance indicators of the applications and when there is a need for a specific application to add additional VMs to service the requests, it is determined whether any shadow VMs for this application are present (S325) in a dormant pool. If so, instead of provisioning one or more new VMs from a VM master image, as noted in FIG. 2, monitoring unit 164 may cause one or more shadow VMs 118 to be reactivated (S340) for this application. This approach is more efficient and helps speed up the time the VM becomes fully ready to service the incoming requests. Accordingly, when the status of a shadow VM 118 is switched to active, the reactivated VM is quickly redeployed and registered (S350) into the active VM pool without the latencies associated with having to reinstantiate or newly provision a VM from a VM master image 145 and to reallocate the computing resources to the newly provisioned VM.

In a scenario when new VMs are to be provisioned for an application, but where there are no shadow VMs present for that application from which the VMs may be instantiated, and if sufficient resources are not available to create the new VMs (S360), shadow VMs 118 that are less valuable may be fully deactivated so that the allocated resources to the shadow VMs may be otherwise freed and utilized to provision and register new VMs (S370, S380, S390). The point of deactivation in a simple implementation may be based on a threshold timeline or in a more sophisticated implementation based on a combination of factors such as the available level of resources in the hosting environment or the potential utility that the resources allocated to the shadow VM 118 may have, if the resources are otherwise allocated.

Depending on implementation, the shadow VMs may be hosted in a pool on one set of physical hosts and active VMs may be hosted in a separate pool on another set of physical hosts. Alternatively, active and shadow pools may be logically separated as opposed to being hosted on separate physical hosts. The elasticity aware VM placement engine 663 may give preference to active VMs over the shadow ones, preempting their resources and cold migrating the VMs to different physical hosts as needed to satisfy resource allocation for active VMs. In an optional implementation, the shadow VMs and active VMs may be physically segregated on different physical machines by site management 160. By physically segregating shadow and active VMs in this manner, host usage and energy utilization in the operating environment 100 may be optimized by taking the hosts that host the inactive VMs off line.

The above-proposed implementations are not intrusive, in that these implementations do not cause any alteration in the host 110 operations and thus may be provisioned on many virtualization platforms. In one embodiment, the site management 160 scales down an application by suspending VM instances rather than terminating them to create shadow VM and resumes the shadow VMs to scale up an application. Site management 160 desirably monitors memory utilization of the shadow VMs and that of the physical hosts as well as the swapping rate at the physical hosts. Using these parameters, the re-provisioning value of the shadow VMs is estimated as a function of residual working set.

In the following, the above disclosed concepts, processes and implementations are discussed in further detail with reference to specific embodiments and methodologies that are common to virtualization in a computing environment and particularly as applicable within the context of cloud computing. It is noteworthy, however, that the disclosed embodiments here are exemplary and in no event should be construed as limiting the scope of the claimed subject matter to particular exemplary embodiments. In one exemplary embodiment, operating environment 100 may comprise an application and operating system key performance indicator (KPI) manager 661, a shadow VM manager 662, elasticity-aware placement engine 663, and elasticity-aware provisioning manager 664.

The application and operating system KPI manager 661 may be implemented to utilize the monitoring information about the application performance as reflected by the KPI manager 661 to compare the information against the target KPI levels and to make dynamic decisions on allocation or deallocation of VM instances. Based on the decisions made, the application and operating system KPI manager 661 may issue provisioning and de-provisioning requests to the elasticity-aware provisioning manager.

The shadow VM manager 662 may determine or estimate the value of keeping the shadow VMs resident by assigning scores or weights to reflect the VMs' relative value. For example, a shadow VM that has been in the dormant status for over a certain period of time, or might have caused significant part of main memory to be reclaimed by the operating system, may be deemed as less valuable than other VMs and be given a low score. The scores may be calculated by way of a background process that may be executed periodically and may be used as additional input by elasticity-aware placement engine 663. Shadow VM manager 662 may be configured so that when the VM scores are computed, the elasticity-aware placement engine 663 uses the scores for further processing.

In one embodiment, a shadow VM manager 662 may be configured to compute the scores and provide the scores based on a request from elasticity-aware placement engine 663. The elasticity-aware placement engine may be utilized to map the VMs to physical hosts and desirably to also map shadow VMs to physical hosts according to the scores calculated by the shadow VM manager 662. The elasticity-aware placement engine 663 may be utilized to minimize an expected average latency of a VM warm up by instantiating an active VM from a shadow VM, with a maximum score where possible, subject to first satisfying the demands of active VMs.

The elasticity-aware placement engine 663 may be configured to try to keep the maximum number of the most valuable (i.e., the "hottest") shadow VMs as reflected by their scores, subject to residual capacity remaining after satisfying demands of the active VMs. The elasticity-aware placement engine may generate or calculate a placement plan. The placement plan may imply migrations. The elasticity-aware placement engine may suggest that a new VM to be implemented by reactivating a shadow VM with existing placement on a physical host and provide the address of the host and shadow VM parameters.

Alternatively, in accordance with one embodiment, elasticity-aware placement engine may determine that a new VM is to instantiated from the master image on a suggested host. These suggestions comprise a placement plan. Provisioning manager may execute the placement plan prepared by the elasticity-aware placement engine. As a part of the provisioning sequence, the shadow VM manager may update the tables of load balancer 162 to reflect the newly provisioned VM.

Elasticity-aware provisioning manager 664 may be configured to execute provisioning requests arriving from application and OS KPI manager 661. For example, when a new request for provisioning arrives, elasticity-aware provisioning manager 664 passes the requested parameters to elasticity aware placement engine 663 to obtain the placement plan for the new VM. Elasticity aware placement engine 663 may either suggest that the new VM may be a reactivation of a shadow VM with existing placement on a physical host (and provides the address of the host and VM shadow VM parameters) or may suggest that a new VM is to be instantiated from the master image on a suggested host.

Elasticity-aware provisioning manager 664 may provide the platform for reactivating a shadow VM or create a new copy, for example. As a step in the provisioning sequence, the elasticity-aware provisioning manager 664 may update the tables of load balancer 162 to reflect the new worker VM. The operating system may reclaim memory allocated to a shadow VM, when an active VM needs additional memory. Upon receiving a deprovisioning request from application and OS KPI manager 661, elasticity aware provisioning manager 664 may stop a VM, disconnect the VM from the load balancer 162 and inform elasticity aware placement engine 663 that treat the stopped VM is to be designated as a shadow VM. As such, the reclamation of resources from the shadow VMs may be handled automatically.

In one implementation, elasticity-aware placement engine 663 may be used to maximize the number of satisfied VM creation requests and to minimize the expected average latency of a VM warm-up by instantiating VMs from the appropriate shadow VMs. A placement algorithm may be used to prepare a suggested placement and placement plan. For example, the placement algorithm of the elasticity-aware placement engine 663 may calculate the suggested placement for active VMs aiming at satisfying the maximum number of active VMs. The placement algorithm may use residual capacity at the hosts to calculate suggested placement for shadow VMs aiming at maximizing the number of shadow VMs with the highest scores (e.g., by allocating resources to shadow VMs in a descending order of the shadow VM scores).

Elasticity-aware placement engine 663 may prepare the placement plan, for example, by way of implementing a schedule of provisioning steps that obtains the suggested placement. The placement plan may potentially require migration of the shadow VMs to one or more different hosts. Accordingly, the shadow VMs may participate in the placement scheme as any other VM. In a placement optimization method, the shadow VMs may be either discarded from a present host, remain on the host, or be migrated to another host, for example.

Desirably, a placement algorithm may be implemented to maximize the placement of active VMs or shadow VMs on a selected (e.g., a minimum) number of hosts, taking into account a preferred objective for minimizing the number of and costs associated with the migration of shadow VMs. Such optimization may be achieved by way of a constraint satisfaction problem in which the constraints define that a certain number of active VMs are to be placed on one or more hosts. Alternatively, a target function may be implemented as a linear combination of one or more of the above goals (e.g., number of active VMs+alpha * number of shadow VMs, where 0<alpha=≤1).

An example of a placement algorithm for VM consolidation on the minimum number of physical hosts is a bin packing heuristic such as First Fit or Best Fit. The algorithm may be modified to manage shadow VMs by applying cache replacement policies such as least recently used (LRU) or least frequently used (LFU) for replacement of the shadow VMs or replacing shadow VMs with the lowest value on a host with a new active VM. This algorithm may help minimize the number of open physical hosts that serve the active VMs, while keeping the most valuable shadow VMs. This heuristic may be further extended to migrate a shadow VM to a different host with available memory instead of deprovisioning the shadow VM.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
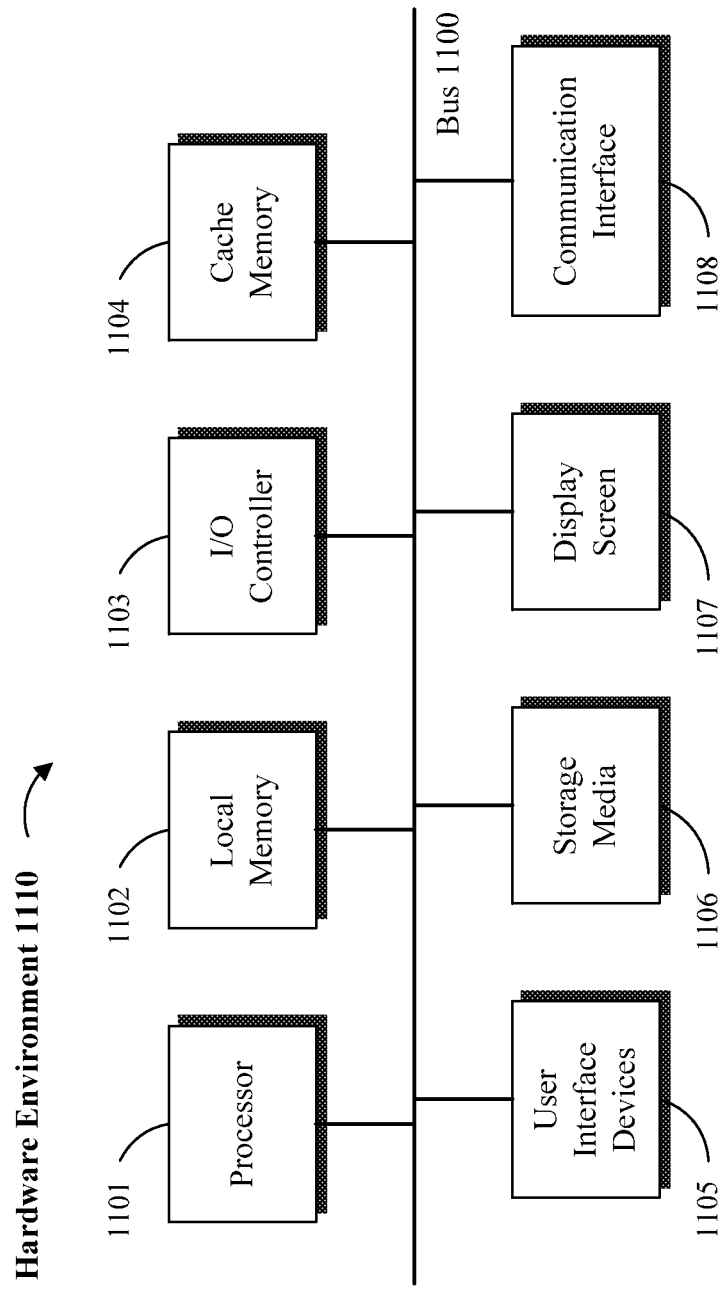
FIGS. 4A and 4B are block diagrams of hardware and software environments in which the disclosed systems and methods may operate, in accordance with one or more embodiments.
Figure 4B:
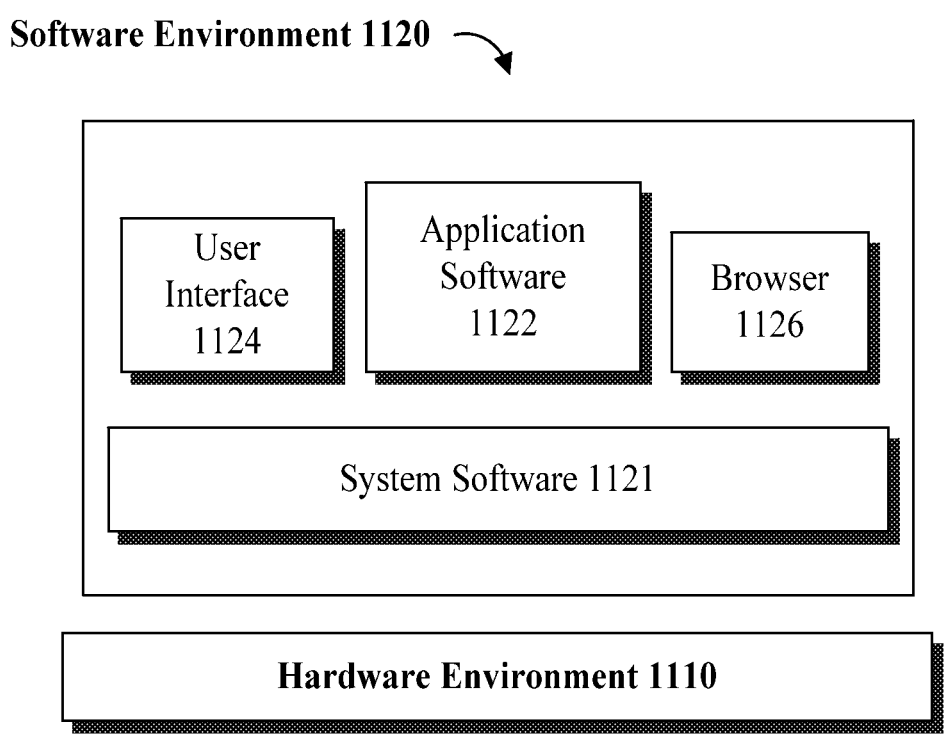

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

As noted earlier, certain embodiments may be implemented in a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Using the on-demand self-service, a cloud consumer may unilaterally provision computing capabilities, such as server time and network storage, as needed automatically without requiring human interaction with the service's provider. Broad network access capabilities may be available over a network and accessed through standard mechanisms that promote use by heterogeneous thin or thick client platforms (e.g., mobile phones, laptops, and PDAs).

Resource pooling allows the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity capabilities may be rapidly and elastically provisioned, in some cases automatically, to quickly scale out and rapidly released to quickly scale in. To the consumer, the capabilities available for provisioning often appear to be unlimited and may be purchased in any quantity at any time. Measured service allows cloud systems automatically control and optimize resource use by leveraging a metering capability at some level of abstraction appropriate to the type of service (e.g., storage, processing, bandwidth, and active user accounts). Resource usage may be monitored, controlled, and reported providing transparency for both the provider and consumer of the utilized service.

Several service models are available, depending on implementation. Software as a Service (SaaS) provides the capability to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS) provides the capability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS) provides the capability to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Several deployment models may be provided. A private cloud provides a cloud infrastructure that is operated solely for an organization. It may be managed by the organization or a third party and may exist on-premises or off-premises. A community cloud provides a cloud infrastructure that is shared by several organizations and supports a specific community that has shared concerns (e.g., mission, security requirements, policy, and compliance considerations). It may be managed by the organizations or a third party and may exist on-premises or off-premises.

A public cloud may provide a cloud infrastructure that is made available to the general public or a large industry group and is owned by an organization selling cloud services. A hybrid cloud provides a cloud infrastructure that is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes. Referring now to FIG. 5A, a schematic of an example of a cloud computing node is shown. Cloud computing node 2010 is one example of a suitable cloud computing node and is not intended to suggest any limitation as to the scope of use or functionality of embodiments described herein. Regardless, cloud computing node 2010 is capable of being implemented and/or performing any of the functionality set forth hereinabove.

In cloud computing node 2010, there is a computer system/server 2012, which is operational with numerous other general purpose or special purpose computing system environments or configurations. Examples of well-known computing systems, environments, and/or configurations that may be suitable for use with computer system/server 2012 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 2012 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 2012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5A, computer system/server 2012 in cloud computing node 2010 is shown in the form of a general-purpose computing device. The components of computer system/server 2012 may include, but are not limited to, one or more processors or processing units 2016, a system memory 2028, and a bus 2018 that couples various system components including system memory 2028 to processor 2016.

Bus 2018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 2012 typically includes a variety of computer system readable media. Such media may be any available media that is accessible by computer system/server 2012, and it includes both volatile and non-volatile media, removable and non-removable media.

System memory 2028 may include computer system readable media in the form of volatile memory, such as random access memory (RAM) 30 and/or cache memory 32.

Computer system/server 2012 may further include other removable/non-removable, volatile/non-volatile computer system storage media. By way of example, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In some instances, the above components may be connected to bus 2018 by one or more data media interfaces. As will be further depicted and described below, memory 2028 may include at least one program product having a set (e.g., at least one) of program modules that are configured to carry out the functions of one or more embodiments.

Program/utility 2040, having a set (at least one) of program modules 42, may be stored in memory 2028 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of one or more embodiments.

Computer system/server 2012 may also communicate with one or more external devices 2014 such as a keyboard, a pointing device, a display 2024, etc.; one or more devices that enable a user to interact with computer system/server 2012; and/or any devices (e.g., network card, modem, etc.) that enable computer system/server 2012 to communicate with one or more other computing devices. Such communication may occur via I/O interfaces 2022. Still yet, computer system/server 2012 may communicate with one or more networks such as a local area network (LAN), a general wide area network (WAN), and/or a public network (e.g., the Internet) via network adapter 2020.

As depicted, network adapter 2020 communicates with the other components of computer system/server 2012 via bus 2018. It should be understood that although not shown, other hardware and/or software components could be used in conjunction with computer system/server 2012. Examples, include, but are not limited to: microcode, device drivers, redundant processing units, external disk drive arrays, RAID systems, tape drives, and data archival storage systems, etc.

Figure 5B:
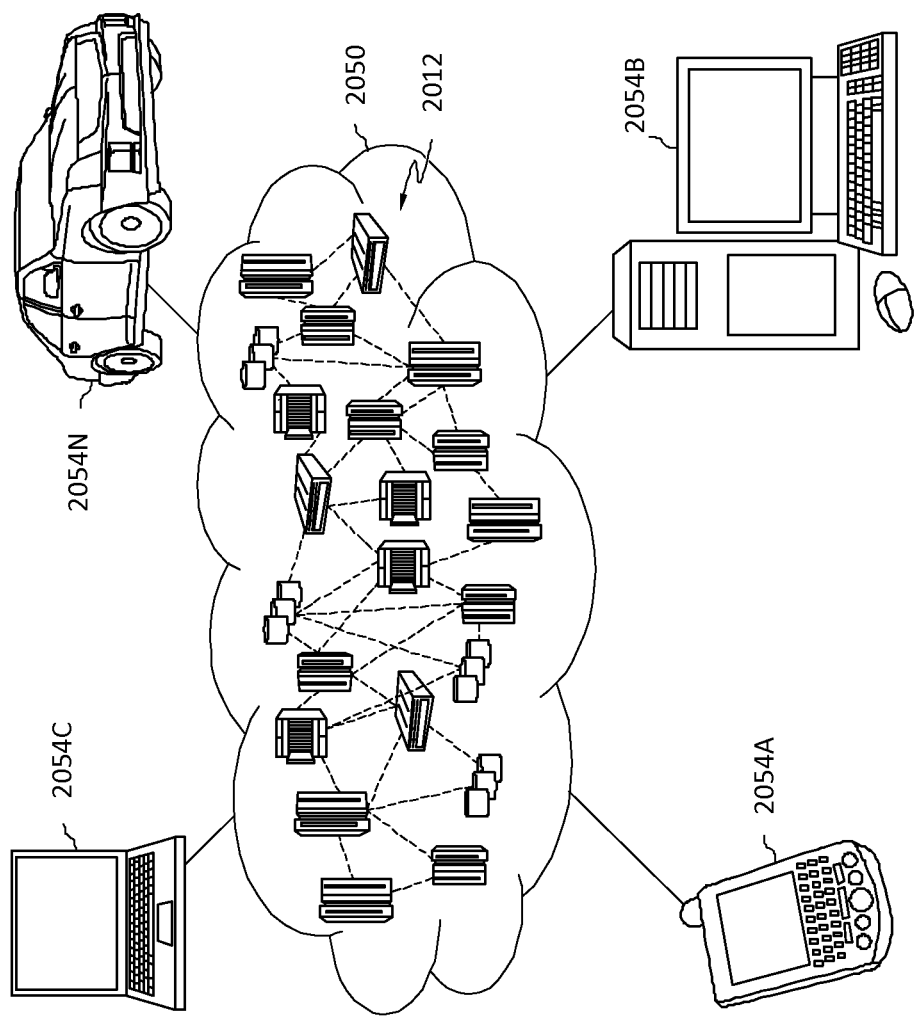

Referring now to FIG. 5B, illustrative cloud computing environment 2050 is depicted. As shown, cloud computing environment 2050 comprises one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate.

Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device.

It is understood that the types of computing devices 54A-N shown in FIG. 5B are intended to be illustrative only and that computing nodes 2010 and cloud computing environment 2050 may communicate with any type of computerized device over any type of network and/or network addressable connection (e.g., using a web browser).

Figure 5C:
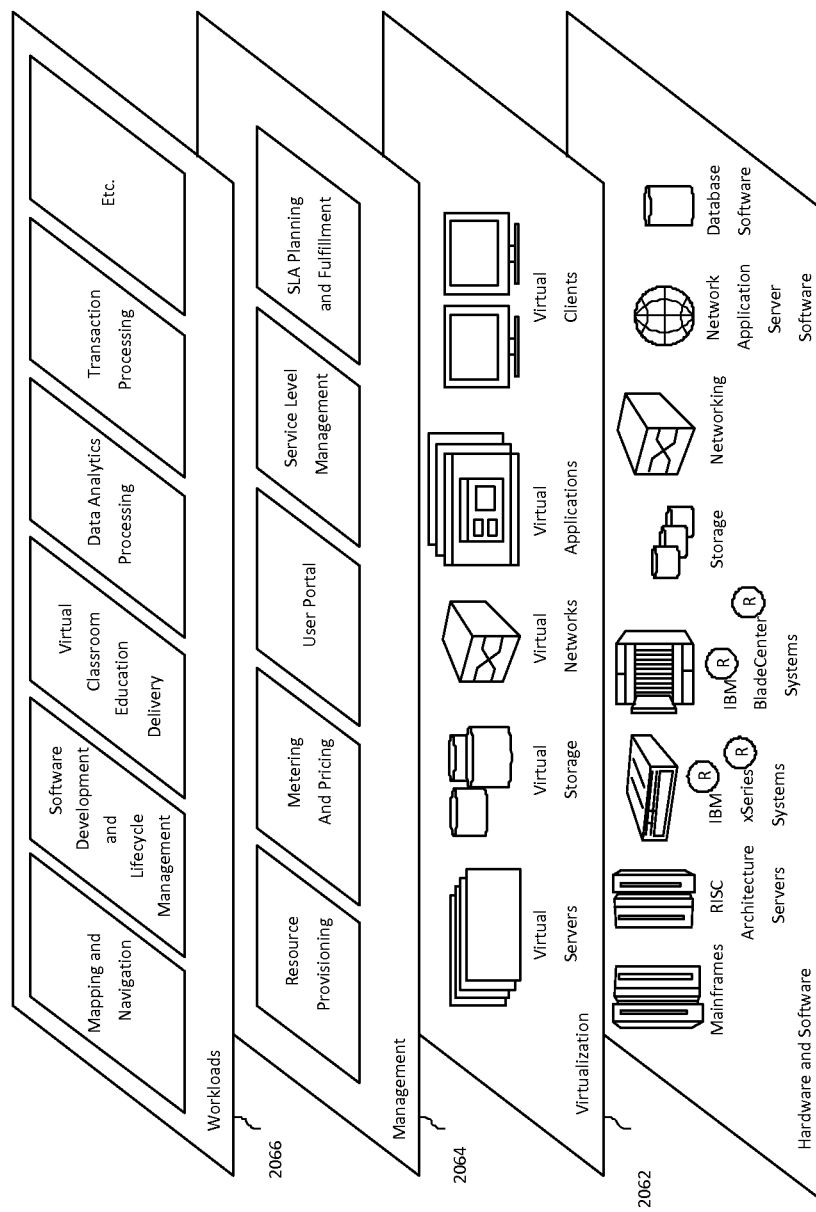

Referring now to FIG. 5C, a set of functional abstraction layers provided by cloud computing environment 2050 (FIG. 5B) is shown. It should be understood in advance that the components, layers, and functions shown in FIG. 5C are intended to be illustrative of one or more embodiments and are not limited thereto. As depicted, the following layers and corresponding functions are provided.

Hardware and software layer 2060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 2062 provides an abstraction layer from which the following examples of virtual entities may be provided: virtual servers; virtual storage; virtual networks, including virtual private networks; virtual applications and operating systems; and virtual clients. In one example, management layer 2064 may provide the functions described below. Resource provisioning provides dynamic procurement of computing resources and other resources that are utilized to perform tasks within the cloud computing environment.

Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met.

Service Level Agreement (SLA) planning and fulfillment provide pre-arrangement for, and procurement of, cloud computing resources for which a future requirement is anticipated in accordance with an SLA. Workloads layer 2066 provides examples of functionality for which the cloud computing environment may be utilized. Examples of workloads and functions which may be provided from this layer include: mapping and navigation; software development and lifecycle management; virtual classroom education delivery; data analytics processing; transaction processing; etc.

A method for managing quality of service in a virtualized computing environment may be disclosed herein. The method may include provisioning one or more active virtual machines (VMs) over one or more hosts in a virtualized computing network, wherein one or more resources are allocated to the active VMs before the active VMs service one or more requests. The method may further include monitoring information associated with quality of service defined for servicing of the requests. The method may further include designating at least an active VM as a shadow VM, in response to results of the monitoring, wherein at least one resource remains allocated to the shadow VM, while the shadow VM enters a dormant state and no longer services any requests.

The method may further include designating the shadow VM as an active VM, in response to the results of the monitoring, wherein the shadow VM is removed from the dormant state and is deemed active for the purpose of servicing one or more requests. The method may further include a new active VM is provisioned, in response to determining that no shadow VMs remain in the dormant state. The method may further include the shadow VM removed from the dormant state and returned to an active state is enable to service requests in a shorter time than if a new active VM is provisioned, due to the activated shadow VM having maintained the allocation of resources to the shadow VM when the shadow VM was in the dormant state.

The method may further include one or more resources allocated to the shadow VM are deallocated, in response to determining that the shadow VM has been in the dormant state for more than a threshold time period. The method may further include the resources allocated to the shadow VM are deallocated in consideration of how actively the shadow VM has been utilized.

The method may further include a first active VM is designated as a shadow VM, in response to the monitoring information indicating that the quality of service is maintainable if workload carried by the first active VM for servicing the requests is distributed over to other active VMs. The method may further include the workload distributed among the VMs for servicing the requests is balanced so that a minimum number of active VMs service the requests up to a workload threshold provided that the quality of service is maintained. The method may further include minimizing the number of active VMs is performed to optimize resource allocation and usage among the active VMs or shadow VMs. The method may further include one or more active VMs or shadow VMs are migrated to other hosts, in response to determining that such migration results in savings in costs associated with resource allocation on one or more hosts.

What is claimed is:

1. A method comprising:
creating a first active virtual machine (VM) on one or more hosts in a virtualized computing network, wherein one or more resources are allocated to the first active VM before the first active VM services one or more requests, the one or more resources including at least one of virtual memory space, CPU resources and physical storage space, and wherein the first active VM is located in one or more active pools of VMs;
monitoring information associated with quality of service defined for servicing of the requests, wherein the quality of service is based on a number of simultaneous user sessions;
determining a number of active VMs needed to provide a service;
designating the first active VM as a first shadow VM in response to the determining the number of active VMs needed to provide the service, wherein at least one resource of the one or more resources remains allocated to the first shadow VM, and wherein the first shadow VM is maintained in a dormant state;
transferring the first shadow VM to an inactive pool of VMs in response to designating the first active VM as a first shadow VM, wherein the first shadow VM is configured to be activated and deployed upon request, wherein one or more shadow VMs are in one or more inactive pools of VMs located on the one or more hosts and one or more active VMs are in one or more active pools of VMs located on the one or more hosts;
scoring the one or more shadow VMs according to the resources of each of the one or more shadow VMs;
calculating a placement plan that places one or more shadow VMs having the highest scores and the one or more active VMs on the one or more hosts;
determining the calculated placement plan satisfies one or more placement objectives, the one or more placement objectives including at least one of maximizing a number of shadow VMs, minimizing the number of hosts, and minimizing costs associated with migrating shadow VMs;
reallocating resources to the one or more shadow VMs having the highest scores based on the calculated placement plan; and
placing the one or more shadow VMs having the highest scores and the one or more active VMs on the one or more hosts according to the calculated placement plan.

2. The method of claim 1, wherein the inactive pool of VMs is located on a host and an active pool of VMs of the one or more active pools of VMs is located on the host, and wherein the inactive pool of VMs and the active pool of VMs are logically separated on the host, the method further comprising:
determining that there is a need for a specific application to add additional VMs to service a request;
determining that at least one shadow VM associated with the specific application is present within the inactive pool of VMs;
reactivating the at least one shadow VM in response to determining that at least one shadow VM associated with the specific application is present in the inactive pool of VMs;
transferring the at least one shadow VM from the inactive pool of VMs to the active pool of VMs and registering the at least one shadow VM with the active pool of VMs as a second active VM in response to reactivating the at least one shadow VM; and servicing the request using the second active VM.

3. The method of claim 1, further comprising:
receiving a length of time the first shadow VM has been in the dormant state;
determining that the length of time the first shadow VM has been in the dormant state satisfies a threshold time period; and
deallocating the at least one resource from the first shadow VM and removing the first shadow VM from the inactive pool of VMs in response to determining that the length of time the first shadow VM has been in the dormant state satisfies the threshold time period.

4. The method of claim 1, further comprising: determining that there is a need for a specific application to add additional VMs to service a request;
determining that no shadow VMs associated with the specific application are present within the inactive pool of VMs;
determining that there are insufficient resources available to create one or more new VMs;
fully deactivating one or more shadow VMs having the lowest scores;
provisioning the one or more new VMs;
registering the one or more new VMs; and
reallocating resources from the one or more deactivated shadow VMs to the one or more registered new VMs.

5. The method of claim 1, the method further comprising:
storing, by a service provider, in a network storage, at least one VM master image;
specifying, by the service provider, the at least one VM master image in a service definition manifest; and
transmitting, by the service provider, the service definition manifest to a site management.

6. The method of claim 5, further comprising:
utilizing the at least one VM master image to provision a VM on the one or more hosts.

7. The method of claim 5, further comprising:
creating, by the site management, one or more VMs at the one or more hosts in response to transmitting the service definition manifest to a site management; and
hosting one or more of the created VMs on a host of the one or more hosts.

8. The method of claim 7, further comprising:
downloading, by the host, a particular VM master image to a local storage device from a network storage device based on the service definition manifest;
caching the particular VM master image in the local storage device; and
creating a new VM by cloning the particular VM master image.

9. A system comprising:
a hardware processor; and
a non-transitory computer-readable storage medium having program instructions embodied therewith, the program instructions executable by the hardware processor to cause the system to:
create a first active virtual machine (VM) on one or more hosts in a virtualized computing network, wherein one or more resources are allocated to the first active VM before the first active VM services one or more requests, the one or more resources including at least one of virtual memory space, CPU resources and physical storage space, and wherein the VMs are located in one or more active pool of VMs;

monitor information associated with quality of service defined for servicing of the requests, wherein the quality of service is based on a number of simultaneous user sessions;

determine a number of active VMs needed to provide a service;

designate the first active VM as a first shadow VM in response to the determining the number of active VMs needed to provide the service, wherein at least one resource of the one or more resources remains allocated to the first shadow VM, and wherein the first shadow VM is maintained in a dormant state;

transfer the first shadow VM to an inactive pool of VMs in response to designating the first active VM as a first shadow VM, wherein the first shadow VM is configured to be activated and deployed upon request, wherein one or more shadow VMs are in one or more inactive pools of VMs located on the one or more hosts and one or more active VMs are in one or more active pools of VMs located on the one or more hosts;

score the one or more shadow VMs according to the resources of each of the one or more shadow VMs;

calculate a placement plan that places one or more shadow VMs having the highest scores and the one or more active VMs on the one or more hosts;

determine the calculated placement plan satisfies one or more placement objectives, the one or more placement objectives including at least one of maximizing a number of shadow VMs, minimizing the number of hosts, and minimizing costs associated with migrating shadow VMs;

reallocate resources to the one or more shadow VMs having the highest scores based on the calculated placement plan; and place the one or more shadow VMs having the highest scores and the one or more active VMs on the one or more hosts according to the calculated placement plan.

10. The system of claim 9, wherein the inactive pool of VMs is located on a host and an active pool of VMs of the one or more active pools of VMs is located on the host, and wherein the inactive pool of VMS and the active pool of VMS are logically separated on the host, the program instructions further causing the system to:

determine that there is a need for a specific application to add additional VMs to service a request;

determine that at least one shadow VM associated with the specific application is present within the inactive pool of VMs;

reactivate the at least one shadow VM in response to determining that at least one shadow VM associated with the specific application is present in the inactive pool of VMs;

transfer the at least one shadow VM from the inactive pool of VMs to the active pool of VMs and register the at least one shadow VM with the active pool of VMs as a second active VM in response to reactivating the at least one shadow VM; and service the request using the second active VM.

11. The system of claim 9, the program instructions further causing the system to:

receive a length of time the first shadow VM has been in the dormant state;

determine that the length of time the first shadow VM has been in the dormant state satisfies a threshold time period; and deallocate the at least one resource from the first shadow VM and remove the first shadow VM from the inactive pool of VMs in response to determining that the length of time the first shadow VM has been in the dormant state satisfies the threshold time period.

12. A computer program product comprising a non-transitory computer readable storage medium having a computer readable program, wherein the computer readable program when executed on a computer causes the computer to:

create a first active virtual machine (VM) on one or more hosts in a virtualized computing network, wherein one or more resources are allocated to the first active VM before the first active VM services one or more requests, the one or more resources including at least one of virtual memory space, CPU resources and physical storage space, and wherein the first active VM is located in one or more active pool of VMs;

monitor information associated with quality of service defined for servicing of the requests, wherein the quality of service is based on a number of simultaneous user sessions;

determine a number of active VMs needed to provide a service;

designate the first active VM as a first shadow VM in response to the determining the number of active VMs needed to provide the service, wherein at least one resource of the one or more resources remains allocated to the first shadow VM, and wherein the first shadow VM is maintained in a dormant state;

transfer the first shadow VM to an inactive pool of VMs in response to designating the first active VM as a first shadow VM, wherein the first shadow VM is configured to be activated and deployed upon request, wherein one or more shadow VMs are in one or more inactive pools of VMs located on the one or more hosts and one or more active VMs are in one or more active pools of VMs located on the one or more hosts;

score the one or more shadow VMs according to the resources of each of the one or more shadow VMs;

calculate a placement plan that places one or more shadow VMs having the highest scores and the one or more active VMs on the one or more hosts;

determine the calculated placement plan satisfies one or more placement objectives, the one or more placement objectives including at least one of maximizing a number of shadow VMs, minimizing the number of hosts, and minimizing costs associated with migrating shadow VMs;

reallocate resources to the one or more shadow VMs having the highest scores based on the calculated placement plan; and place the one or more shadow VMs having the highest scores and the one or more active VMs on the one or more hosts according to the calculated placement plan.

13. The computer program product of claim 12, wherein the inactive pool of VMs is located on a host and an active pool of VMs of the one or more active pools of VMs is located on the host, and wherein the inactive pool of VMs and the active pool of VMs are logically seperated on the host, wherein the computer readable program further causes the computeer to:

determine that there is a need for specific application to add additional VMs to service a request;
determine that at least one shadow VM associated with the specific application is present within the inactive pool of VM;
reactivate the at least one shadow VM in response to determining that at least one shadow VN associated with the specific application is present in the inactive pool of VMS;
transfer the at least one shadow VM from the inactive pool of VMs to the active pool of Vms and register the at least one shadow VM with the active pool of VMs as a second active VM in response to reactivating the at least one shadow VM; and
service the request using the second active VM.

14. The computer program product of claim 12, wherein the computer readable program further causes the computer to:
receive a length of time the first shadow VM has been in the dormant state;
determine that the length of time the first shadow VM has been in the dormant state satisfies a threshold time period; and
deallocate the at least one resource from the first shadow VM and remove the first shadow VM from the inactive pool of VMs in response to the determination that the length of time the first shadow VM has been in the dormant state satisfies the threshold time period.

\* \* \* \* \*